United States Patent
Kim et al.

(10) Patent No.: US 7,587,908 B2
(45) Date of Patent: Sep. 15, 2009

(54) INTEGRAL TYPE AIR CONDITIONER WITH AIR FILTRATION

(75) Inventors: Jae Cheon Kim, Namwon-si (KR); Myung Soo Kim, Changwon-si (KR); Kyung Hun Han, Sachun-si (KR)

(73) Assignee: LG Electronics Inc., Seoul (KR)

( * ) Notice: Subject to any disclaimer, the term of this patent is extended or adjusted under 35 U.S.C. 154(b) by 583 days.

(21) Appl. No.: 10/931,999

(22) Filed: Sep. 2, 2004

(65) Prior Publication Data

US 2005/0056039 A1    Mar. 17, 2005

(30) Foreign Application Priority Data

Sep. 16, 2003 (KR) .................... 10-2003-0063982
Oct. 2, 2003 (KR) .................... 10-2003-0068588

(51) Int. Cl.
*F25D 23/12* (2006.01)

(52) U.S. Cl. ....................................................... 62/262
(58) Field of Classification Search ............... 62/262, 62/263; 312/101; 454/201
See application file for complete search history.

(56) References Cited

U.S. PATENT DOCUMENTS 5,193,355 A * 3/1993 Matsumi ...................... 62/262

* cited by examiner

*Primary Examiner*—Melvin Jones
(74) *Attorney, Agent, or Firm*—McKenna Long & Aldridge LLP

(57) ABSTRACT

An integral type air conditioner is provided. The integral type air conditioner includes a filter for selectively filtering air discharged to an inside and a passage guide means for introducing air into the filter during an air cleaning operation. The air conditioner also has a cabinet forming an appearance of the air conditioner.

14 Claims, 9 Drawing Sheets

INTEGRAL TYPE AIR CONDITIONER WITH AIR FILTRATION

This application claims the benefit of Korean Patent Application No. 2003-63982, filed in Korea on Sep. 16, 2003 and Korean Patent Application No. 2003-68588, filed in Korea on Oct 2, 2003, which is hereby incorporated by reference for all purposes as if fully set forth herein.

BACKGROUND OF THE INVENTION

1. Field of the Invention

The present invention relates to an air conditioner, and more particularly, to an integral type air conditioner in which an air cleaner filter is provided at a predetermined portion of the air conditioner to thereby enabling both an air cleaning function and an air conditioning function.

2. Description of the Related Art

In a general integral type air conditioner, an indoor unit part and an outdoor unit part are constructed as a single body thereby obviating a long hose which eases installation, transportation, etc., thereby increasing demand. Further, the indoor unit part is disposed indoors to cool air, and the outdoor unit part is disposed outdoors to cool hot working fluid.

FIG. 1 is an exploded perspective view illustrating a conventional integral type air conditioner.

Construction and operation of the conventional integral type air conditioner will be described with reference to FIG. 1.

The air conditioner includes a base panel 1 formed on a bottom surface of the air conditioner; an indoor unit part formed indoors to cool indoor air; and an outdoor unit part formed outdoors to exhaust hot air.

The indoor unit part includes a front grill 3 formed on an indoor front surface of the base panel 1; an inhale grill 4 formed on a front surface of the front grill 3; an indoor heat exchanger 5 formed at an inner side of the front grill 3; an air guide 7 formed at an inner side of the indoor heat exchanger 5; a scroll 9 formed at an inner side of the air guide 7; an inflow guide 11 formed at a front surface of the scroll 9 that corresponds with the indoor heat exchanger 5; and an indoor fan 13 formed within the scroll 9.

Discussion of the construction and operation for the indoor unit part will be made below.

At a lower side of the front grill 3, an inhale part 31 is formed as a passage through which indoor air is introduced. At an upper side of the front grill 3, a discharge grill 32 is formed which allows air heat-exchanged in the indoor heat exchanger 5 to be again discharged toward the indoors.

The indoor heat exchanger 5 is disposed at an inner side of the front grill 3. The indoor heat exchanger 5 exchanges heat between the entering through the intake part 31 and the working fluid.

The air guide 7 partitions the air conditioner into indoor and outdoor portions. Accordingly, the air guide 7 shields an indoor cool air from an outdoor hot air by the air guide 7. Further, a brace 8 is formed at an upper stage of the air guide 7 that connects with a shroud 18 which will be described below.

A flow guide surface 91 is formed within the scroll 9. As may be seen in FIG. 1, the flow guide surface 91 has a curvature from one side to the other side to guide smooth flow of the indoor air. Further, an orifice 11 includes an orifice hole 12 which guides indoor air passing through the indoor heat exchanger 5 into an indoor fan 13. The orifice 11 also has a discharge guide 111 formed at an upper stage of the orifice 11 to guide heat-exchanged air into a discharge grill 32.

The indoor fan 13 intakes indoor air through the inhale part 31, the indoor heat exchanger 5 and the orifice hole 12. Additionally, the indoor fan 13 is a centrifugal fan which intakes air through the orifice hole 12, and then blows the air in a centrifugal direction. The outlet air from the indoor fan 13 is guided along the flow guide surface 91 to flow into the discharge guide 111.

The above description is for the indoor unit part of the integral type air conditioner. A construction and operation of the outdoor unit part partitioned from the indoor unit part by the air guide 7 will be henceforth described below.

The outdoor unit part includes a motor 15 formed outside of the air guide 7; and a blower fan 17 fixed to an outdoor rotor axis of the motor 15. The outdoor unit part also has a shroud 18 formed on the base panel 1 to guide an air stream formed by the blower fan 17; an outdoor heat exchanger 19 formed at the outdoor base panel 1 to face with the shroud 18; and an outer case 21 for forming an outershell of the air conditioner.

The motor 15 protrudes such that two sides of a rotation axis of the motor 15 face each other. One side rotation axis passes through the air guide 7 and extends to a center of the scroll 9, thereby rotating the indoor fan 13. Additionally, the other side of the rotation axis is formed at the blower fan 17 which results in an outdoor airflow. The blower fan 17 further includes a ring 171 to connect its wing ends with one another.

The shroud 18 includes a passage hole 181 within which the blower fan 17 is positioned. Further, the shroud 18 guides outside air the blower fan 17 intakes, and forces the flow of outdoor air towards the outdoor heat exchanger 19. The shroud 18 connects to both side ends of the outdoor heat exchanger 19, and is supported by the brace 8 at an upper stage.

The outdoor heat exchanger 19 allows the intake air from outside and the operation fluid of an air conditioning cycle to be heat-exchanged with each other.

A compressor 20 is disposed as a structural element of the air conditioning cycle on the base panel 1 between the air guide 7 and the shroud 18. On the base panel 1, a compressor mounting part 10 on which the compressor 20 is mounted is formed.

FIG. 2 is a view illustrating a usage state of a related-art air conditioner.

Referring to FIG. 2, when the air conditioner begins operation, the indoor unit part introduces air through the inhale part 31 disposed at a lower side surface of the front grill 3. The indoor part then cools the introduced air and outputs the cooled air back indoors through the discharge grill 32 disposed at an upper surface of the front grill 3. Further, the outdoor unit part intakes air through the passage hole of the outer circumference surface of the outer case 20. Heat-exchange then occurs with the air the outdoor unit part intakes and the heat-exchanged air exits toward the outdoors through another passage hole provided on a rear surface of the outer case 20. In the drawings arrows represent airflow.

However, the above-described related-art integral type air conditioner has drawbacks.

The related-art integral type air conditioner does not filter and clean circulated inner air. To further illustrate, a related-art air conditioner only cools or warms air, but does not have filter contaminants contained in the air.

In particular, since air circulation between an indoor unit and an outdoor unit is generally shielded operation of the air conditioner, the inner air worsens. Hence, contamination of the indoor air continues, so that a user having bronchus and the like is badly influenced by the contaminated air.

These problems are matters seriously taken by customers concerned about their health.

SUMMARY OF THE INVENTION

Accordingly, the present invention is directed to an integral type air conditioner that substantially obviates one or more problems due to limitations and disadvantages of the related art.

It is an object of the present invention to provide an integral type air conditioner capable of providing both an air conditioning function and an air cleaning function at the same time.

It is another object of the present invention to provide an integral type air conditioner which allows selective operation of the air cleaning function according to a choice by a user.

It is a further object of the present invention to provide an integral type air conditioner capable of enhancing a front appearance of the air conditioner.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided an integral type air conditioner comprising: a front panel disposed at a front side of the air conditioner; an air guide for partitioning the air conditioner into an indoor unit part and an outdoor unit part and guiding air flow; an indoor heat exchanger and an outdoor heat exchanger for performing heat exchange between working fluid and indoor air. The integral type air conditioner also includes a cabinet which forms an appearance of the air conditioner and has an air discharge part formed at a predetermined position thereof; a high performance filter formed at a predetermined air discharge position for filtering the air discharged from the indoor heat exchanger; and a passage guide assembly for allowing selective introduction of air into the high performance filter.

In an aspect of the present invention, there is provided an integral type air conditioner comprising: a front panel disposed at a front side of the air conditioner, and having a lower portion through which air enters and an upper portion through which air is discharged. In addition, the integral type air conditioner includes a base panel that forms a lower surface of the air conditioner and a lower air guide mounted on the base panel for partitioning the air conditioner into an indoor unit part formed at an approximate front portion of the base panel and an outdoor unit part formed at a rear portion of the front panel. The integral type air conditioner also has an upper air guide mounted on the lower air guide that forms a passage of the discharged air; a high performance filter formed at a predetermined point on a circulation path of indoor air and adapted for filtering the indoor air and a passage guide assembly that allows air to be selectively introduced into the high performance filter. The integral type air conditioner also has a cabinet forming an appearance of the air conditioner with a filter grill formed at a portion where air filtered by the high performance filter is discharged.

In another aspect of the present invention, there is provided an integral type air conditioner comprising: a front panel disposed at a front side of the air conditioner; a base panel disposed at a lower surface of the air conditioner and a lower air guide mounted on the base panel, for partitioning the air conditioner into an indoor unit part formed at an approximate front portion of the base panel and an outdoor unit part formed at a rear portion of the front panel. Moreover, the integral type air conditioner includes an upper air guide mounted on the lower air guide and forming a passage of the discharged air; an inflow guide formed at a front portion of the lower air guide for guiding inflow air and a high performance filter formed at an upper portion of the upper air guide for filtering the air discharged toward an upward direction of the air conditioner. The integral type air conditioner also has a passage guide assembly for allowing air to be selectively introduced into the high performance filter; and a cabinet forming an appearance of the air conditioner having a filter grill formed at a portion where air filtered by the high performance filter is discharged.

In a further aspect of the present invention, there is provided an integral type air conditioner comprising: a base panel disposed at a lower surface of the air conditioner; an air guide mounted on the base panel for partitioning the air conditioner into an indoor unit part formed at a front portion of the base panel and an outdoor unit part formed at a rear portion of the front panel. The integral type air conditioner further includes an inflow guide formed at a front portion of the air guide for guiding the air introduced from an indoor space; heat exchangers formed respectively at the indoor unit part and the outdoor unit part and two or more indoor fans and outdoor fans for blowing air onto an entire surface of the heat exchangers. Additionally, the integral type air conditioner has a compressor mounted at a center portion of the outdoor fan on the base panel and a high performance filter formed at an upper portion of the upper air guide for filtering the air discharged toward an upward direction of the air conditioner. The integral type air conditioner also has a passage guide assembly for allowing air to be selectively introduced into the high performance filter; and a cabinet forming an appearance of the air conditioner and provided with a filter grill formed at a portion where air filtered by the high performance filter is discharged.

In a further another aspect of the present invention, there is provided an integral type air conditioner comprising: an air guide for partitioning the air conditioner into an indoor unit part and an outdoor unit part which intakes indoor air through a front surface of the air conditioner and allows the heat-exchanged air to be discharged into an indoor space through at least two paths. The integral type air conditioner also includes an indoor heat exchanger for performing heat exchange between working fluid and indoor air; a high performance filter adapted for filtering the air discharged from the indoor heat exchanger; and a passage guide assembly for allowing air to be selectively introduced into the high performance filter.

According to the integral type air conditioner of the present invention, indoor environment can be kept in more clean status.

Also, since the air cleaning operation can be performed by a user's choice, it can be prevented that the air conditioning efficiency is lowered, which may occur in the air conditioning operation.

Further, the inventive air conditioner provides an effect due to a graceful appearance.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the embodiments of the present invention, examples of which are illustrated in the accompanying drawings.

Figure 1:
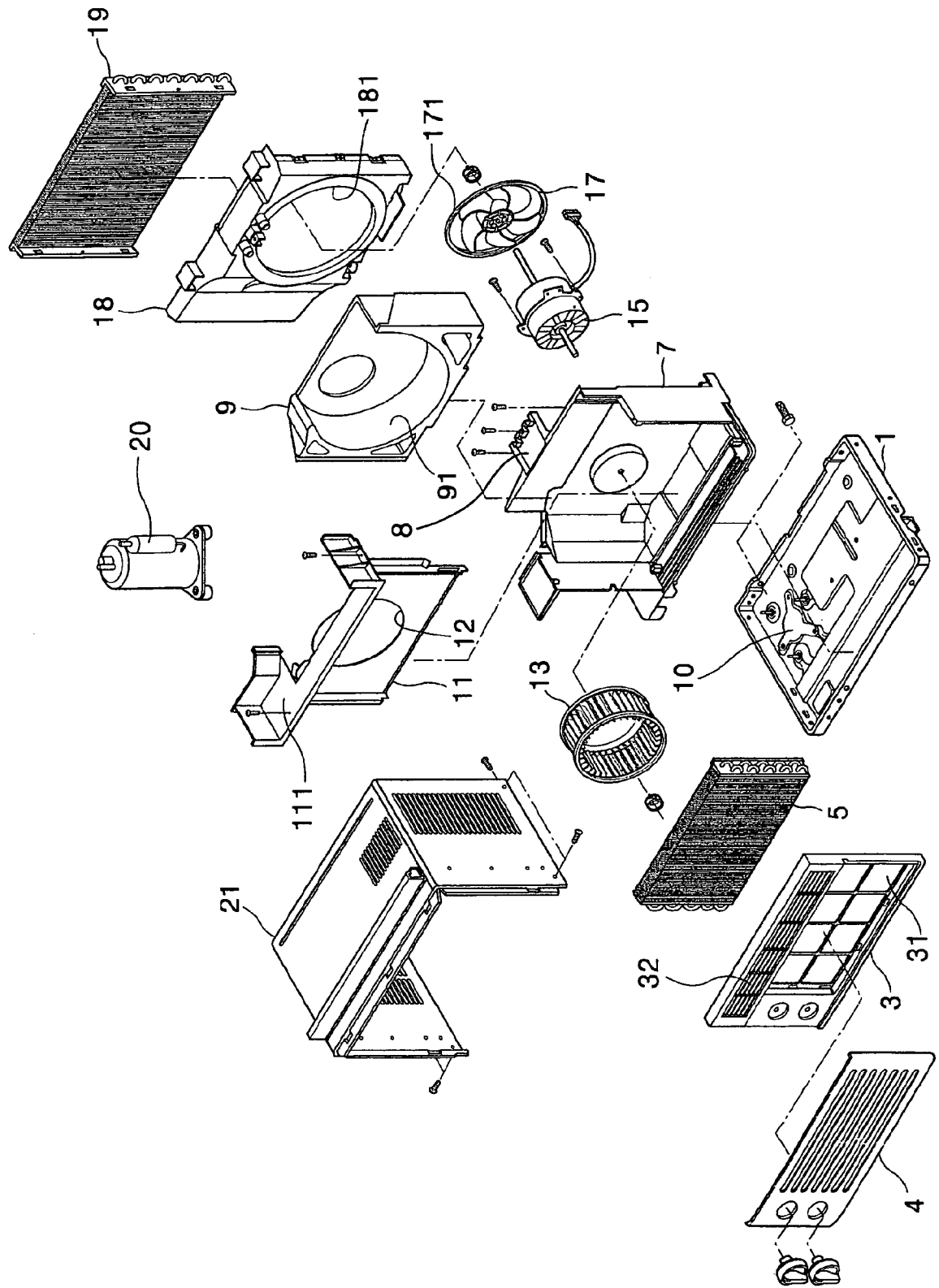
FIG. 1 is an exploded perspective view of an integral type air conditioner according to the conventional art.
Figure 2:
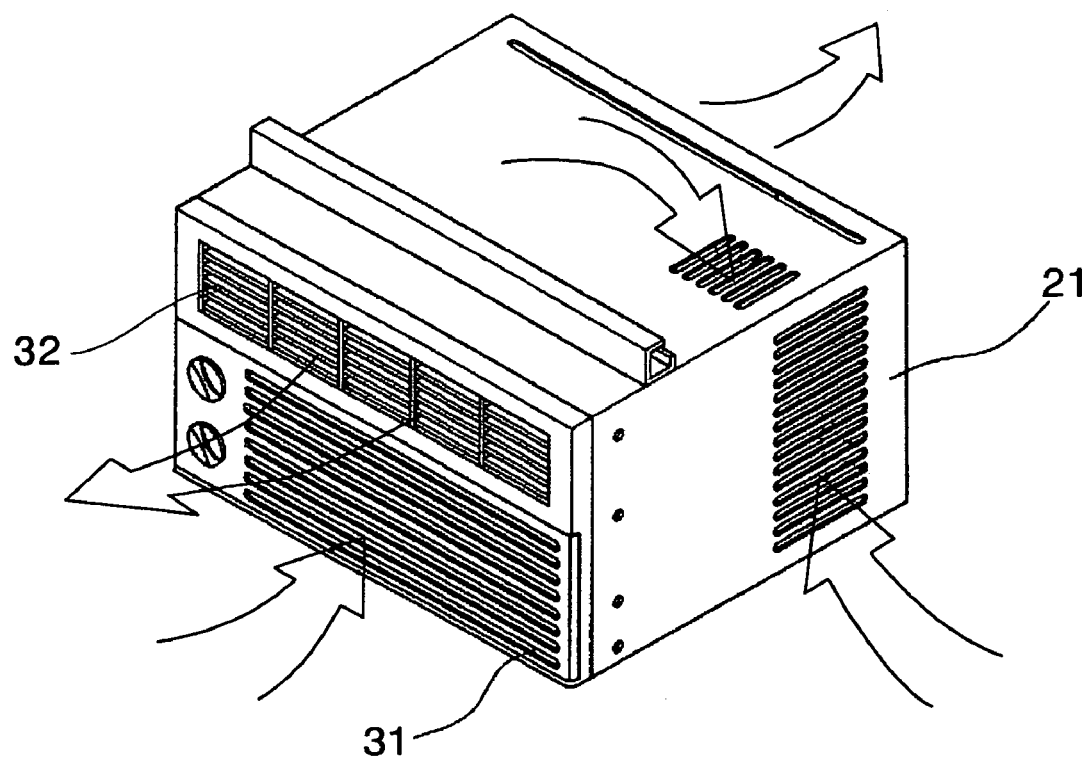
FIG. 2 is a perspective view illustrating a usage state in the conventional air conditioner.
Figure 3:
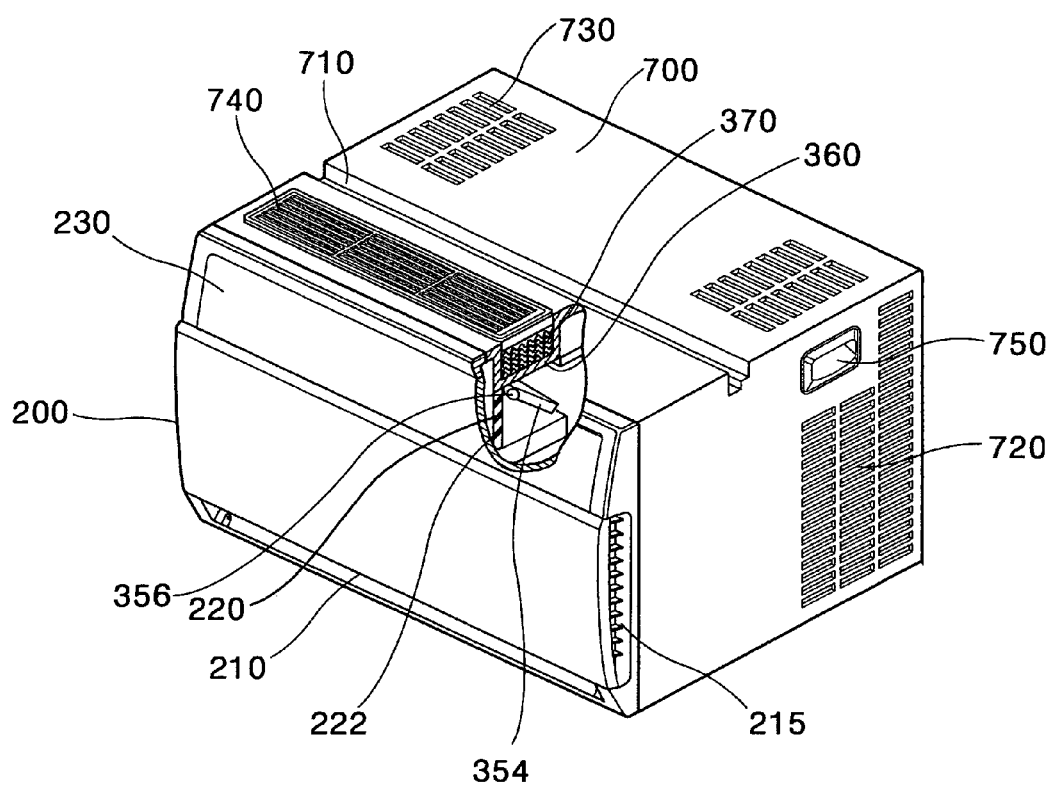
FIG. 3 is a partial cutaway perspective view of an integral type air conditioner according to an embodiment of the present invention.
Figure 4:
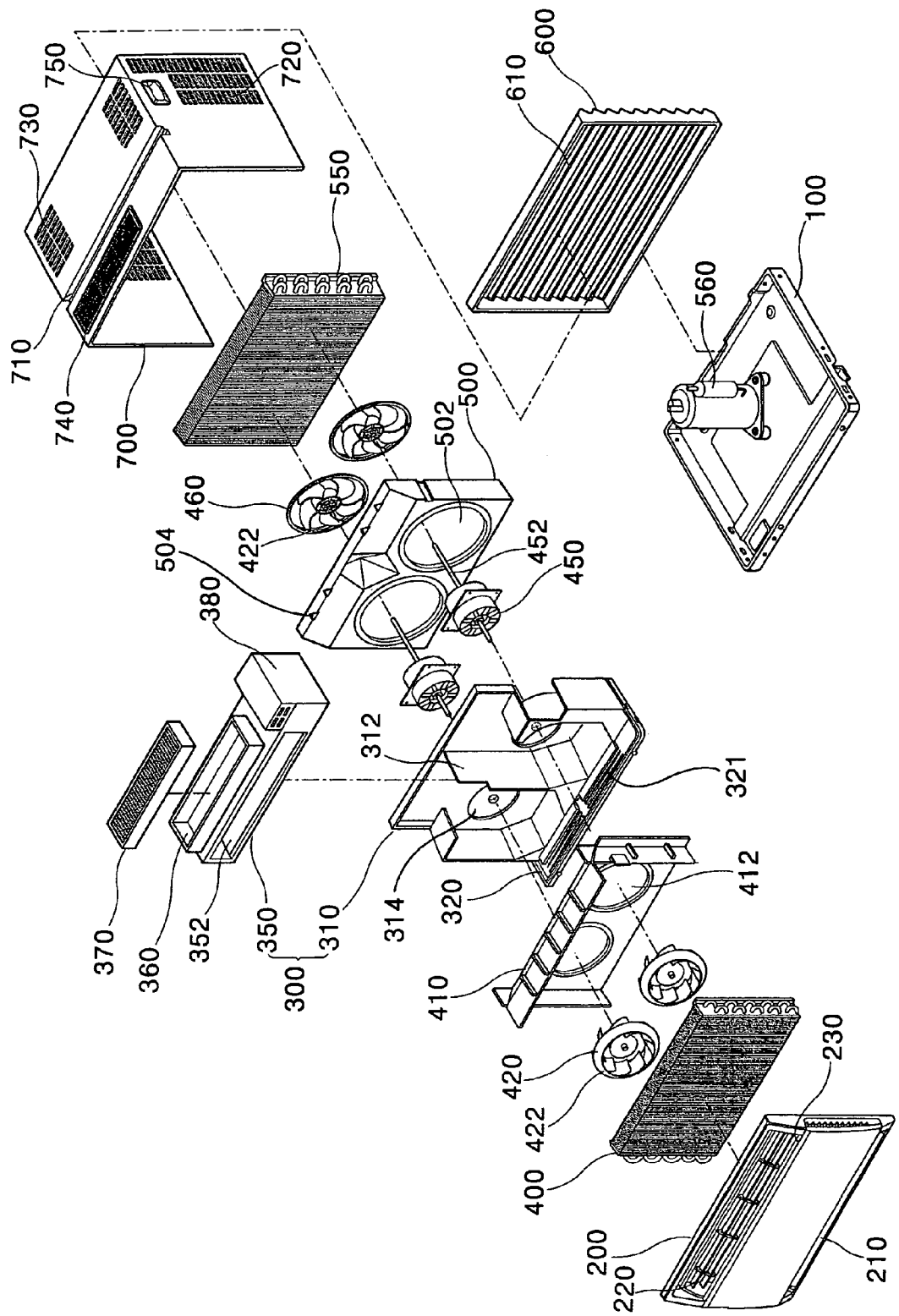
FIG. 4 is an exploded perspective view of an integral type air conditioner according to the present invention.

FIG. 3 is a partial cutaway perspective view of an integral type air conditioner according to an embodiment of the present invention, and FIG. 4 is an exploded perspective view of an integral type air conditioner according to the present invention.

Referring to FIGS. 3 and 4, an integral type air conditioner includes a base panel 100 that is the bottom of the air conditioner. The integral type air conditioner also has a cabinet 700 that provides an outer appearance of the air conditioner and in which various parts constituting a heat exchange cycle are housed. An indoor side of the cabinet 700 has an indoor unit part which intakes warm air and exhausts cool air and an outdoor unit part received in an outdoor part of the cabinet 700 that cools working fluid.

Hereinafter, the construction of the indoor unit part will be described.

In the air conditioner according to the present invention, the construction of the indoor unit part includes a front panel 200 disposed at a front most end of the air conditioner to form the outershell structure of the front side and a discharge door 230 arranged at a rear side of the front panel 200. The discharge door 230 selectively opens and closes a discharge part of the front panel. In addition, the air conditioner has an air guide 300 arranged on the base panel 100 that partitions the air conditioner into the indoor unit part and the outdoor unit part. The air guide 300 includes an upper air guide 350 and a lower air guide 310 in order to guide air flow in the indoor unit part. The air conditioner also includes an inner base plate 320 integrally formed at a lower portion of the lower air guide 310. Moreover, the air conditioner has left and right barriers 312 formed on a central portion of a front surface of the lower air guide 310 in an upper and lower direction and a discharge passage 352 formed in a front side of the upper air guide 350. The discharge passage 352 guides cooled air discharged from an indoor fan 420 to the front panel 200. In addition, the air conditioner includes a filter installation part 360 that protrudes in an upward direction on the upper air guide 350 and a control box 380 installed at a right side of the upper air guide 350. The control box 380 controls the operation of the air conditioner. Further, the air conditioner has an indoor heat exchanger 400 arranged in a front side of the air guide 300 which cools inner air and an inflow guide 410 formed between the indoor heat exchanger 400 and the air guide 300. The inflow guide forms an inflow path of air. The air conditioner also includes an indoor fan 420 arranged inside the lower air guide 310 which causes an indoor air flow and a fan motor 450 arranged at a rear side of the indoor fan 420. The fan motor allows rotation of the indoor fan 420.

Next, the construction of the outdoor unit part will be described.

The outdoor unit part includes a shroud 500 arranged in a rear side of the outdoor unit. In this embodiment, the shroud 500 is located a predetermined distance from the air guide 300. The shroud 500 guides air flow in the outdoor unit part. The outdoor unit part also includes an outdoor fan disposed in a through hole 502 of the shroud 500. The outdoor fan forcibly blows an outdoor air in order to facilitate heat exchange. ; In addition, the outdoor unit part has an outdoor heat exchanger 550 in a rear side of the shroud 500 and a compressor 560 mounted on the base panel 100 of the outdoor unit part which constitutes a heat exchange cycle. Moreover, the outdoor unit part has a rear panel 600 arranged in a rear side of the outdoor heat exchanger 550 and through which heat-exchanged hot air discharges.

In the integral type air conditioner according to the present invention, the construction of the indoor unit part will now be described in more detail.

The front panel 200 includes a front inhaling part 210 formed at a lower side of the front panel 200 that corresponds to an inlet for intaking air from a space to be air conditioned into the indoor side of the air conditioner. The front panel 200 also has a discharge part 220 formed at an upper side of the front panel 200 through which heat-exchanged air discharges into a space to be air conditioned. The heat-exchanged air selectively discharges through either the aforementioned discharge part 220 or the filter installation part 360. Alternatively, a filter may be installed inside the filter installation part 360 that filters foreign particles in the discharged air.

In an alternative embodiment of the present invention, the discharge part 220 may be formed at both sides of the front panel 200. To further illustrate, in order to cool the indoor side by discharging cool air in a side direction in relation to a front side of the air conditioner and to enhance an appearance of the air conditioner, a side inhaling part 215 may be formed at both side ends of the front panel 200. The side inhaling part 215 may be formed together with or separately from the front inhaling part 210. Also, the front side of the front panel 200 may have a convex configuration in order to enhance the appearance of the air conditioning unit.

A rear side of the front panel 200 has a discharge door 230 that selectively opens and closes the discharge part 220. The discharge door 230 selectively opens or closes the discharge part 220 by sliding in an upward or downward direction as desired.

At the front end of the discharge part 220, a discharge guide member 222 that guides the discharge direction of the discharged air is further provided.

Figure 5:
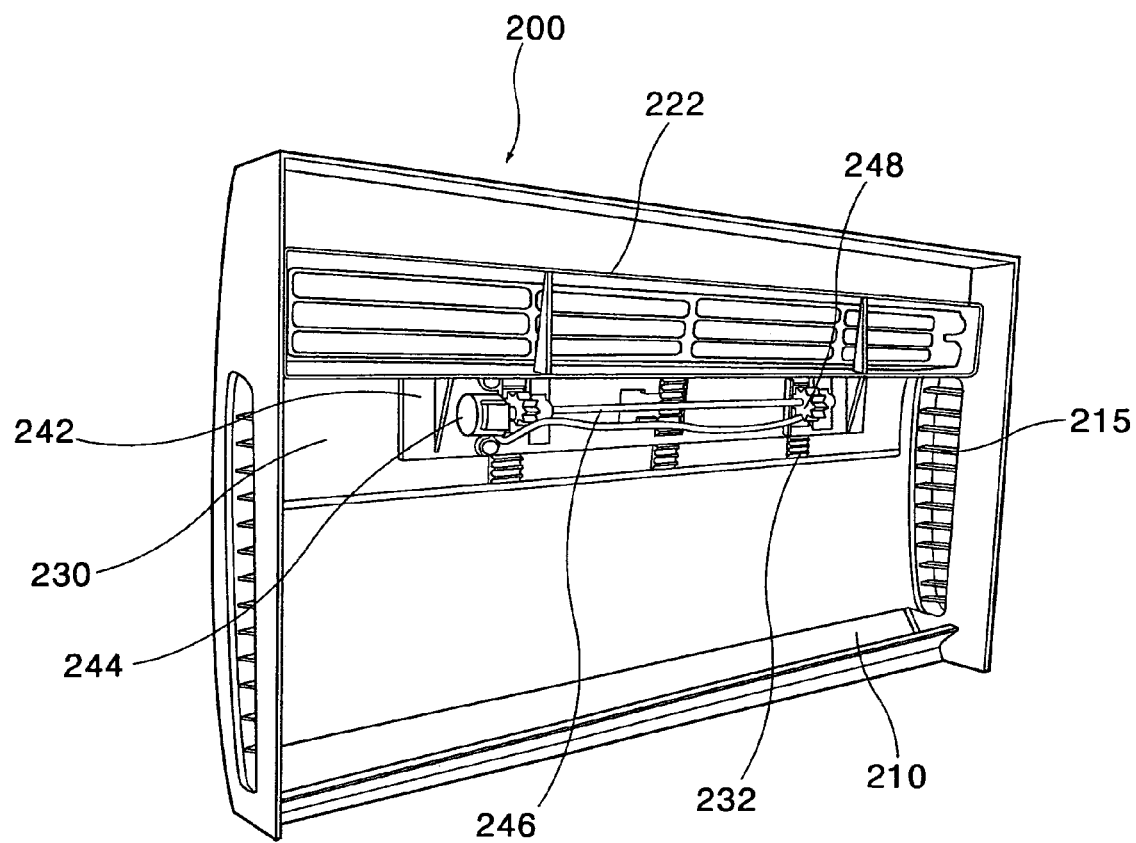
FIG. 5 is a rear perspective view of a front panel in an integral type air conditioner according to the present invention.

A rear surface of the front panel 200 has a door opening/closing assembly that opens and closes the discharge door 230 in an upward or downward direction. The door opening/closing assembly is shown in FIG. 5 and will be described later.

The inner base plate 320 protrudes from a lower side of the lower air guide 310 in a front direction. The inner base plate 320 corresponds to the front end of the base panel 100 and fixes to the base panel 100. An upper portion of the inner base plate 320 collects and exhausts water condensed by the indoor heat exchanger 400 to an outdoor space. At the upper portion of The inner base plate 320 also includes a guide rib 321 at an upper portion thereof that collects the condensed water.

At a front center portion of the lower air guide 310, a left and right barrier 312 is formed in a longitudinal direction. In this embodiment, the left and right barrier 312 protrudes in a front direction from the front center portion of the lower air guide 310 thereby partitioning the front space of the lower air guide 310 into a left space and a right space. The left and right barrier 312 balances in the center of gravity due to the indoor fans 420 and the motors 450 respectively arranged at the left side and the right side. In addition, airflow from the respective indoor fans 420 may be formed independently.

At both portions of the lower air guide 310, indoor fan installation grooves 314 are formed. The indoor fan installation grooves 314 correspond to the diameter of the indoor fan 420. In addition, a circumference of the indoor fan installation grooves protrudes toward the front side a predetermined amount.

The discharge passage 352 protrudes a predetermined portion from the rear end of the upper air guide 350 toward the front side. A front end of the discharge passage 352 corresponds to the discharge part 220 of the front panel 200.

On the upper air guide 350, a filter installation part 360 protrudes in an upward direction. A high performance filter 370 that filters air discharged into the indoor space mounts on the filter installation part 360 from an upper side.

The high performance filter 370 is a high efficiency filter with the same filtering capacitance as that used in a general air conditioner, and completely filters contaminants in air. In order to obtain a high efficiency filtering effect, a filter having a volume as large as possible may be used. In accordance with an embodiment of the present invention where the high performance filter 370 has a large volume, the present invention includes the filter installation part 360, a grill mounting part 742 and a filter grill 740.

The control box 380 has a predetermined size and accommodates capacitors and control elements such as a circuit board (not shown) that control the operation of the air conditioner. The control box 380 may control the operation of the air conditioner.

Heat exchange occurs between the working fluid of a heat exchange cycle and the intake air in an air conditioning space in the indoor heat exchanger 400. Although not shown in the drawings, a tubular path through which working fluid is introduced or discharged may be formed.

The inflow guide 410 guides air heat-exchanged in the indoor heat exchanger 400. At the inflow guide 410, a pair of through holes 412 correspond to the indoor fan installation grooves 314 of the lower air guide 310. Inside the air guide 300, the indoor fans 420 provide a driving force for air flow in the indoor unit side. The indoor fans 420 have one pair at the left side and one pair at the right side. For example, the indoor fans 420 are respectively located at the indoor fan installation grooves 314 formed at the left and right sides of the lower air guide 310.

A front end of a central shaft 452 of each fan motor 450 inserts into the indoor fan 420 and the other end inserts into the outdoor fan 460. Accordingly, the fan motor 450 simultaneously supplies a rotational driving force to both the indoor fan 420 and the outdoor fan 460. To further illustrate, the rotational shaft of the fan motor 450 extends in both directions, and the indoor fan 420 couples with one end and the outdoor fan 460 couples with the other end. Also, the fan motor 450 mounts on the rear surface of the air guide 300. In an alternative embodiment of the present invention may be supported by a separate bracket.

In addition, inside the discharge passage 352, a discharge passage guide means such as a discharge passage guide assembly is formed which guides discharged air.

In detail, a fluid passage guide plate 354 provides functionality for the discharge passage guide means. In one embodiment, the fluid passage guide plate is shaped in a rectangular plate and guides the flow of the air forcibly blown and introduced into the inside of the upper air guide 350. The fluid passage guide plate guides the air in a proper direction according to the air conditioning function or air filtering function.

In detail, a front end of the fluid passage guide plate 354 is hinge-fixed to a lower front end of the filter installation part 360. In addition, a stepping motor (see 356 of FIG. 8) which drives the fluid passage guide plate 354 is installed at a predetermined portion of the fixed portion. Thus, as the stepping motor (356 of FIG. 8) rotates according to an input from a user, a rear end of the fluid passage guide plate 354 moves up and down thereby selectively shielding the discharge passage 352.

In detail, air introduced into an inside of the upper air guide 350 by the indoor fan 420 discharges (i.e., air conditioning function) through the discharge part 220 located at the front side of the discharge passage 352 according to an input from a user. In addition, air may be introduced through an upper portion of the discharge passage 352 and discharged (i.e., air cleaning function) upward via the high performance filter 370, in which the discharge direction is determined by the fluid passage guide plate 354.

To further illustrate, if the rear end of the fluid passage guide plate 354 ascends to be leveled by a forward rotation of the stepping motor 356, the fluid passage guide plate 354 shields the lower portion of the filter installation part 360, so that the air which is forcibly discharged by the indoor fan 420 is discharged in the front direction of the discharge passage 352. At this time, only the air conditioning function is performed.

Alternatively, if the rear end of the fluid passage guide plate 354 descends by a reward rotation of the stepping motor 356 and is contacted with the bottom of the discharge passage 352, the front surface of the discharge passage 352 is shielded, so that the air which is forcibly blown by the indoor fan 420 is discharged upward via the high performance filter 370. At this time, the air cleaning function as well as the air conditioning function is performed.

A vent hole (not shown) may be further formed at a predetermined portion of the air guide 300 and the inflow guide 410. In this embodiment, outer air is selectively enters through the vent hole thereby venting inner air. Accordingly, a damper is installed at a predetermined portion of the air guide 300, and is operated by a separate driving motor to open and close the vent hole.

Meanwhile, although not shown in the drawings, a vent tunnel which guides outdoor air may be further formed such that outer air is introduced through the vent hole. To further illustrate, a vent tunnel which guides rear air to a front side and allows introduction of the guided air into the vent hole may be further formed below a brace (not shown) connecting between the upper end of the air guide 300 and the shroud 500.

In the integral type air conditioner according to the present invention, the construction of the outdoor unit part will be described in detail.

At the left and right portions of the shroud, vent holes 502 are respectively formed which correspond to the indoor fan installation grooves 314 of the air guide 300. Also, at an upper portion of the shroud 500, a guide bead 504 which guides condensed water guided by a ring 422 formed on an outer circumference of the outdoor fan 460 may be formed.

The ring 422 splashes condensed water on a lower portion in order to spray the splashed water on the outdoor heat exchanger 550. The ring 422 lowers temperature of the outdoor heat exchanger 550 during cooling operations thereby enhancing cooling efficiency.

The outdoor heat exchanger 550 discharges indoor heat to an exterior while the air conditioner is in the cooling mode. It should be noted that when the air conditioner is in the cooling mode, heat exchange occurs between the working fluid of a heat exchange cycle and outside air.

The compressor 560 connects with the indoor heat exchanger 400 and the outdoor heat exchanger 550 by a tubular path in order to circulate refrigerant. In particular, the compressor is installed between the air guide 300 and the shroud 500. In addition, in this embodiment, the compressor 560 is also disposed between the left fan motor 450 and the right fan motor 450. As such, the compressor 560 is located at the center of the outdoor unit part with respect to the left and right directions.

At the rear panel 600, a plurality of grill discharge outlets 610 through which inner air discharges are formed in the horizontal direction. The grill discharge outlets 610 are made by forming a plurality of triangular protrusions on the rear panel and cutting away a furrow portion between the protrusions in the horizontal direction.

FIG. 5 is a rear perspective view of a front panel in an integral type air conditioner according to the present invention.

The door opening/closing means will be described with reference to FIG. 5.

The door opening/closing means includes a motor installation part 242 fixed to a rear surface of the front panel 200 and a driving motor 244 installed on the rear surface of the motor installation part 242. The door opening/closing means also has a rotational shaft 246 through which the central shaft of the driving motor 244 extends, a rotational pinion 248 installed on the rotational shaft 246, and a rack 232 having a gear which engages with a gear of the rotational pinion 248.

Also, the rack 232 is formed on and integrally with a rear surface of the discharge door 230 in a longitudinal direction. The rack 232 allows movement of the discharge door 230 in an upward and a downward direction according to the rotation of the rotational pinion 248. For example, if the driving motor 244 is driven by an externally applied power, the rotational pinion 248 that interlocks with the driving motor 244 rotates and the discharge door 230 slides in an upward or downward direction.

Figure 6:
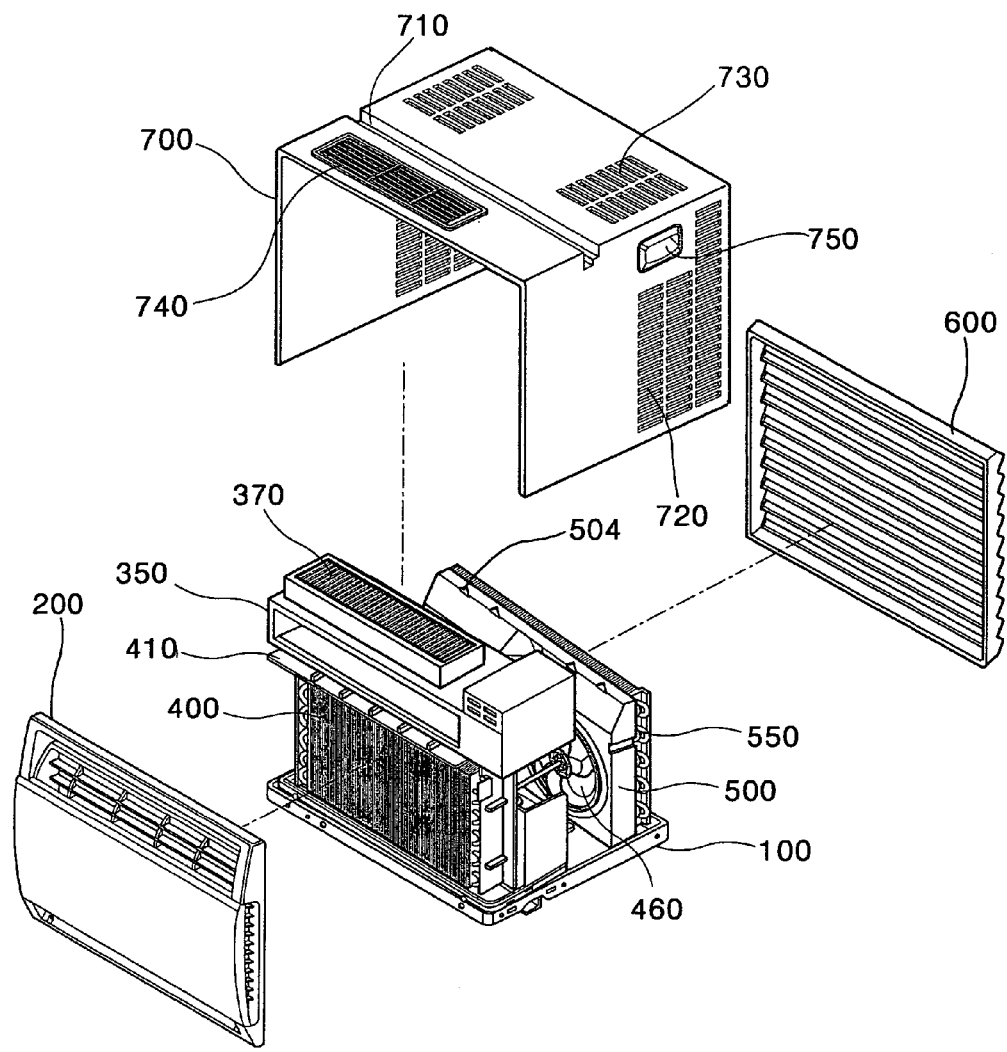
FIG. 6 illustrates an appearance structure of an integral type air conditioner according to the present invention.
Figure 7:
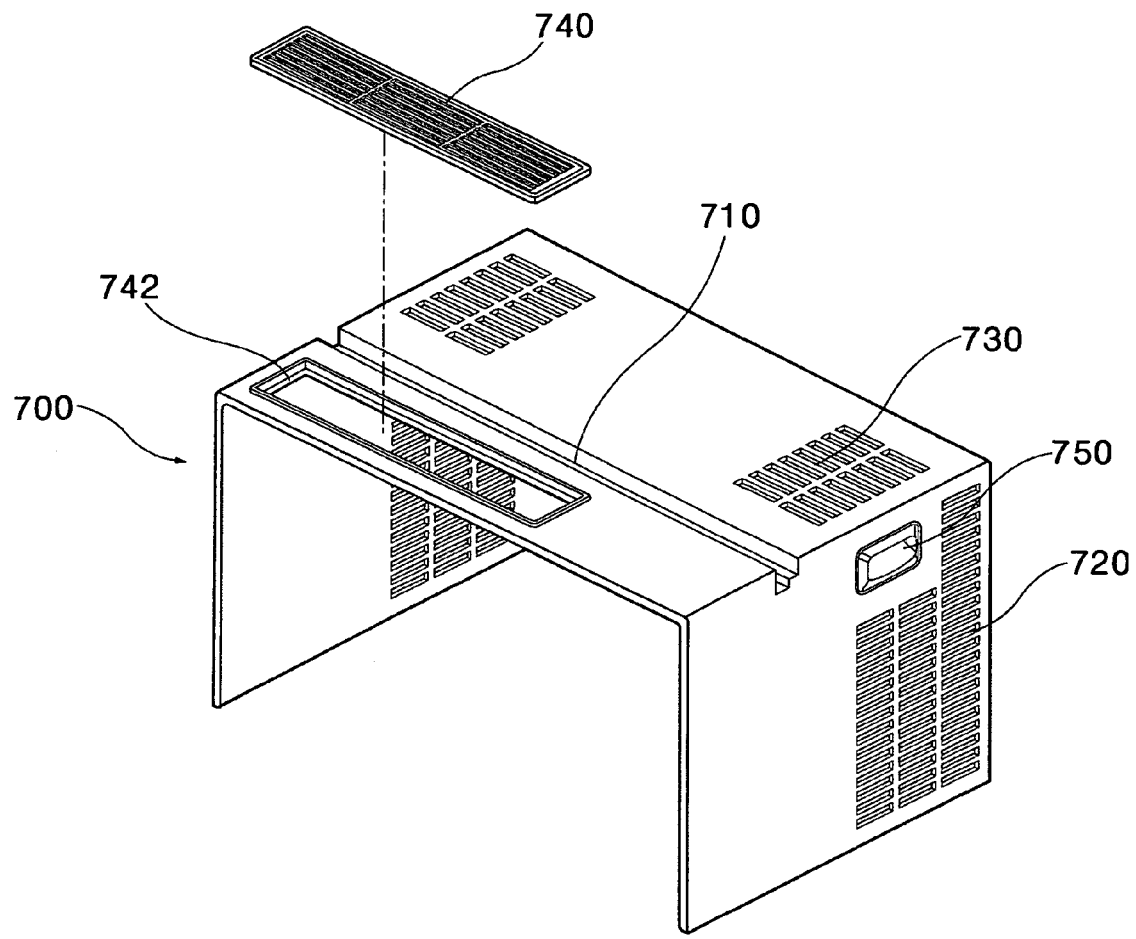
FIG. 7 is an exploded perspective view of a cabinet in an integral type air conditioner according to the present invention.

FIG. 6 illustrates an appearance structure of an integral type air conditioner according to the present invention. FIG. 7 is an exploded perspective view of a cabinet in an integral type air conditioner according to the present invention. The construction and operation of the cabinet in an integral type air conditioner according to the present invention will be described in detail with reference to FIGS. 6 and 7.

The cabinet 700 covers the air conditioner except for a lower side portion and a front and rear portion in order to shield the elements of the air conditioner. The cabinet 700 also forms air passages inside the air conditioner.

In detail, an installation guide part 710 is formed on an upper surface of the cabinet 700 in a horizontal direction. The installation guide part 710 recesses in a downward direction a predetermined depth from the upper surface of the cabinet 700. The installation part 710 stably mounts the air conditioner along a window frame of a building. A curtain assembly or the like can be mounted on the installation guide part 710.

At rear portions of both side portions of the cabinet 700, a plurality of side inhale holes 720 are formed through which air enters from side directions. At a rear portion of the upper portion of the cabinet 700, a plurality of upper inhale holes 730 are selectively formed through which air enters from an upper direction.

Also, at the front edge of the upper portion of the cabinet 700, i.e., at the front side of the installation guide part 710, a filter grill 740 which guides the discharge direction of the air that passes the high performance filter 370 is installed. The filter grill 740 corresponds to the upper surface of the high performance filter 370 mounted on the upper air guide 350. As such, the air that has passed the high performance filter 370 smoothly discharges to the outside. Also, since the high performance filter 370 is formed in a separate assembly, the high performance filter 370 may be equipped attachably and detachably. The grill mounting part 742 on which the filter grill 740 mounts both protrudes from and penetrates the upper surface of the cabinet 700. The filter grill 740 mounts on the grill mounting part 742 from an upper direction. Accordingly, during cleaning of the filter grill 740, the filter grill 740 is lifted up, separated from the cabinet 700 and then cleaned. A handgrip 750 is formed at both side portions of the cabinet 700 for easy installation and movement.

Hereinafter, operation of an integral type air conditioner as constructed above will be described. It is noted that the operation of the integral type air conditioner is described on the basis of an operation standard of a cooling mode.

Figure 8:
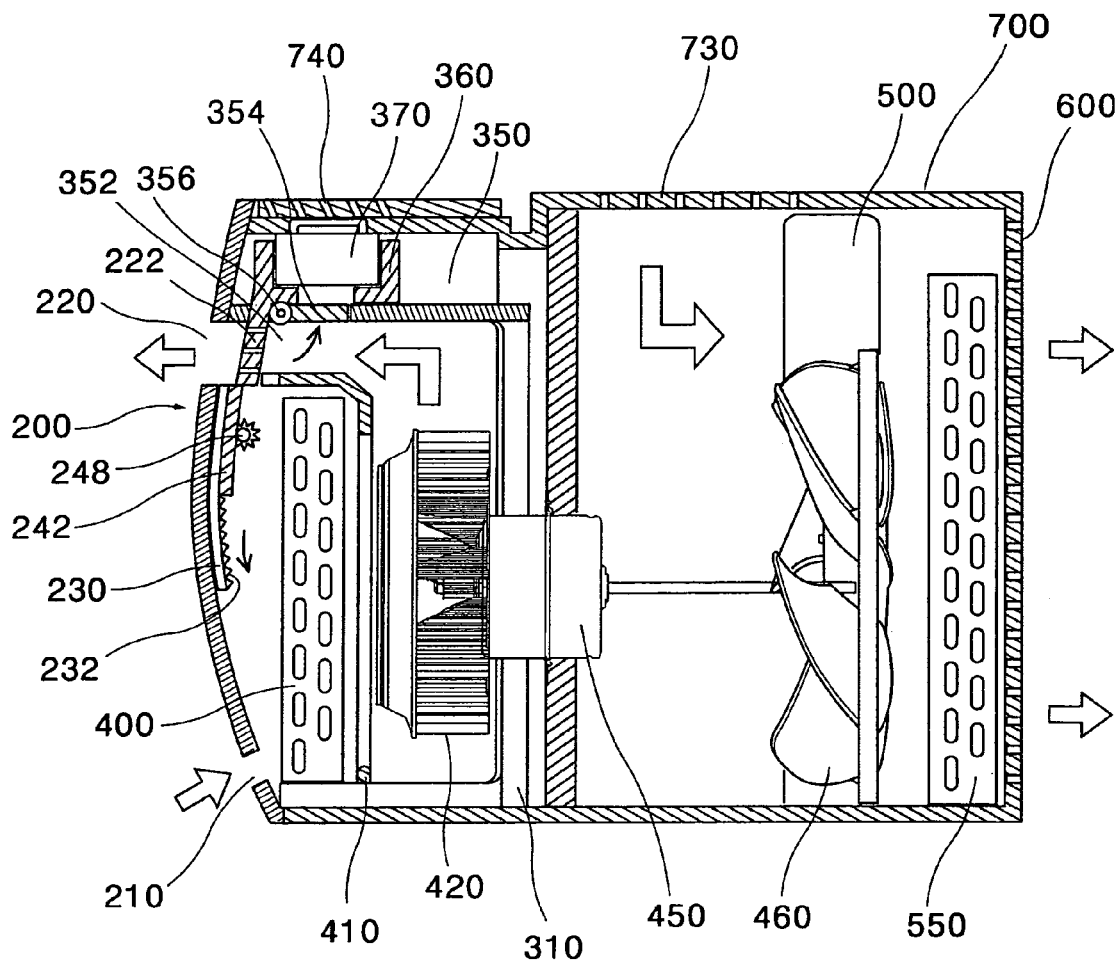
FIG. 8 illustrate an operation when the air cleaning function is not performed in an integral type air conditioner according to the present invention.
Figure 9:
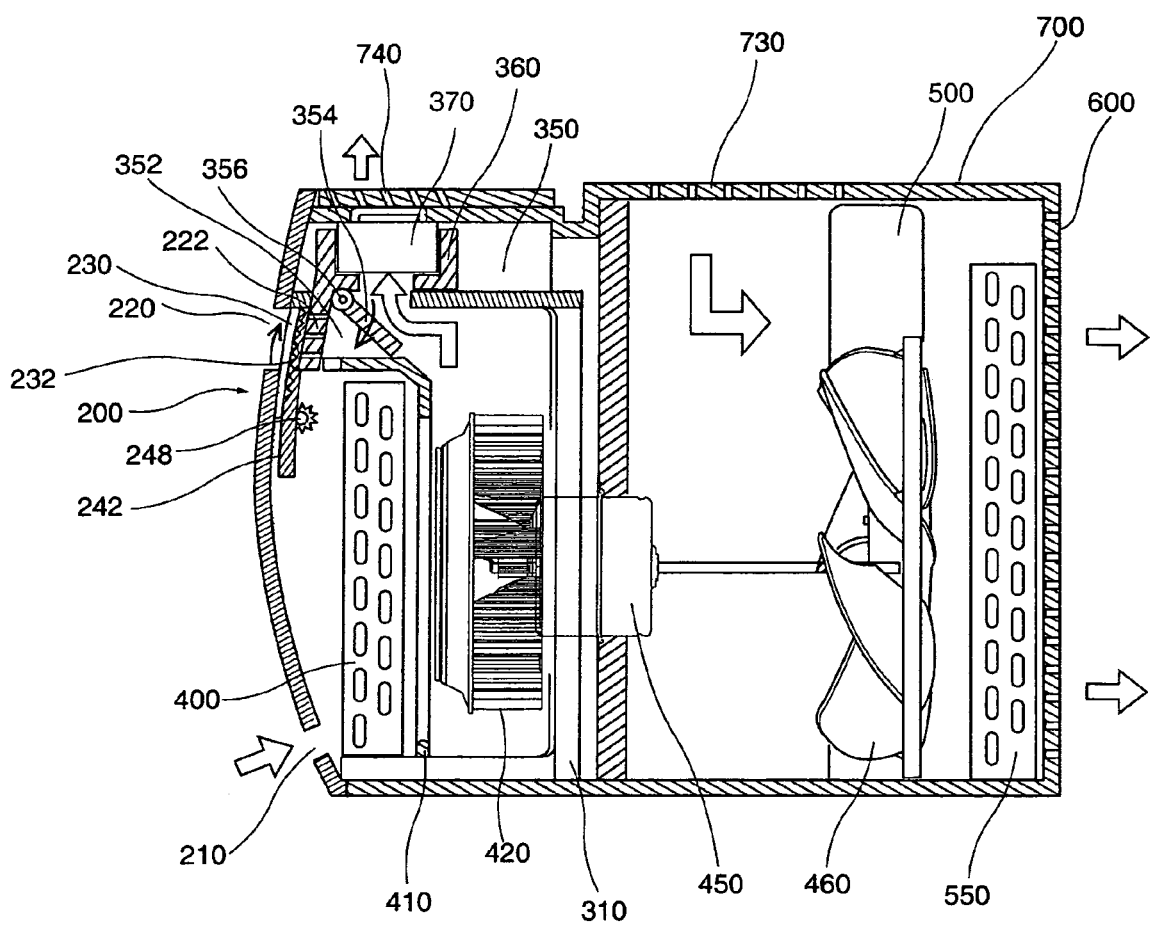
FIG. 9 illustrates an operation when the air cleaning function is performed in an integral type air conditioner according to the present invention.

FIGS. 8 and 9 are longitudinal sectional views of an integral type air conditioner according to the present invention. In the above drawings, it is noted that only main parts are shown and not all parts in order to describe the operation of the air conditioner.

Specifically, FIG. 8 illustrates an operation when the air cleaning function is not performed in an integral type air conditioner according to the present invention. FIG. 9 illustrates an operation when the air cleaning function is performed in an integral type air conditioner according to the present invention.

During operation of the air conditioner, the left and right fan motors 450 rotate the left indoor fan 420 and the right indoor fan 460. Additionally, the compressor 560 (see FIG. 4) circulates work fluid through the heat exchange cycle. In this embodiment, the indoor fan 420 uses the centrifugal fan thereby effectively using the space of the indoor side construction. The outdoor fan 460 uses an axial fan in order to increase an airflow.

Driving the indoor fan 420 at the left and right sides causes the introduction of indoor air through the front inhaling part 210 and through the indoor heat exchanger 400. The air heat-exchanged to a relatively low temperature in the indoor heat exchanger 400 enters into the indoor fan 420. The air is then discharges in the circumference direction of the indoor fan. For this, the centrifugal fan of the indoor fan 420 can be applied, and especially the indoor fan 420 may be a turbo fan so as to increase airflow.

The air discharged in the circumference direction of the indoor fan 420 is guided along the air guide 300. Additionally, the air guide 300 guides discharged air during air purification operations.

First, the operation of the air conditioner when air cleaning is not performed will be described.

When air discharges toward the front through the discharge passage, the stepping motor 356 rotates thereby moving a rear portion of the passage guide plate 354 in an upward direction thereby opening the front of the discharge passage 352 and closing a bottom surface of the filter mounting part 360.

Accordingly, as shown in FIG. 8, the air forcibly blown by the indoor fan 420 does not flow into the high performance filter 370. Instead, the air discharges to the front via the discharge passage 352 through the discharge part 220. In this embodiment, the discharge door 230 moves in a downward direction as shown, thereby opening the discharge part 220. In this embodiment, the solid line arrows depict the operation states of the discharge door 230 and the passage guide plate 354. Additionally, the block arrows depict the airflow when the air purifying function is not performed.

In an embodiment where the air conditioner of the present invention purifies air will now be described.

In order to clean air discharged to a space being air conditioned, the stepping motor 356 moves the rear end of the passage guide plate 354 in a downward direction. As such, the passage guide plate 354 shields the discharge passage 352 such that air forcibly blown from the indoor fan 420 flows into the lower surface of the filter mounting part 360 as shown in FIG. 9.

The high performance filter 370 purifies air introduced into the internal space of the filter mounting part 360 from the bottom as the air passes through the high performance filter 370. The purified air discharges to the top through the filter grill 740. In this embodiment, the discharge door 230 moves to the top as shown in FIG. 9 thereby shielding the discharge part 220 since air is not discharged to the front through the discharge passage 352.

If the above-described discharge air passes through the high performance filter 370, foreign substances in the air are filtered such that the air conditioner supplies cleaner air to the space being air conditioned. Accordingly, since the air supplied into the space being air conditioned goes through the cleaning process as well as the cooling process, a more favorable environment within the space being air conditioned can be promoted.

The outdoor fan 460 causes the inflow of outdoor air into the air conditioner. In particular, the rotation of the outdoor fan 460 causes an inflow of external air into the air conditioner through the side inhale hole 720 and the upper inhale hole 730 of the cabinet 700. The air introduced into the air conditioner by the outdoor fan 460 is guided along the shroud 500. Additionally, is heat-exchanged with the work fluid of the heat exchange cycle while passing through the outdoor heat exchanger 550 heat exchange occurs between the air discharged to the rear by the outdoor fan 460. In addition, hot air of the work fluid is transmitted to the discharge air for discharge outdoors.

At this time, air introduced into the inside of the air conditioner having a relatively low temperature in the room temperature state is via an outer circumference of the compressor 560. The air disposed about the outer circumference of the compressor 560 lowers the temperature of the compressor 560.

The air conditioner according to the present invention can obtain the same air cleaning effect when it is used as either a heat pump or a refrigerator.

The fan motor 450 couples at a rear surface of the lower air guide with a separate bracket (not shown). However, the fan motor 450 may couple with air conditioner using any suitable method. To further illustrate, the fan motor 450 may be coupled directly to the air guide. In detail, only the driving shaft of the fan motor is not inserted into the lower air guide. Instead, the entire body of the fan motor 450 can be inserted into the lower air guide and mounted.

Also, a picture frame may be installed at a front surface of the front panel 200 thereby enhancing an appearance of the integral type air conditioner. Further, a flat display panel, for instance, a LCD monitor or a PDP panel can be formed at a vacant space of the front surface of the front panel 200 for use as an electronic picture, a monitor or a television.

Furthermore, the compressor is installed at the center portion of the integral type air conditioner increases the portability of the air conditioner of the present invention. Although the outdoor fan 460 includes two separate units, i.e., one pair, the compressor is not necessarily placed there between. More specifically, although the compressor is placed at any one side of the outdoor construction in the embodiments shown above, heat exchange efficiency in accordance with the present invention may be enhanced if blowing occurs throughout the entire area of the heat exchanger.

Also, since air discharged into a space being air conditioned may pass through a high performance filter, the air conditioner of the present invention cleans the air of the space.

Further, since the air conditioner of the present invention has both an air cleaning function and an air conditioning function, the air conditioner may be used as either an air conditioner or an air cleaner. Therefore the present invention minimizes fabrication costs.

Furthermore, the present invention allows easy selection by a user of the air cleaning function.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An integral type air conditioner comprising:
a front panel disposed at a front side of the air conditioner and having an air discharge part on a front thereof, the front side of the air conditioner being located in an indoor space and the air discharge part discharging indoor air;
a lower air guide for partitioning the air conditioner into an indoor unit part and an outdoor unit part and guiding flow of the introduced indoor air to the air discharge part;
an upper air guide mounted on an upper position of the lower air guide and forming a plurality of passages for discharging the indoor air;
an indoor heat exchanger for performing heat exchange between a working fluid and indoor air;
an outdoor heat exchanger for performing heat exchange between the working fluid and outdoor air;

a cabinet forming an appearance of the air conditioner and including at least an air discharge part formed at an upper position thereof for discharging the heat exchanged indoor air by the indoor heat exchanger to an indoor space;

a high performance filter positioned at one of the passages of the upper air guide and communicating with the air discharge part of the cabinet, for filtering the heat exchanged indoor air passing through the indoor heat exchanger; and a passage guide assembly moveably installed in the upper air guide to guide the heat exchanged indoor air to be selectively discharged through the air discharge part of the front panel or the air discharge part of the cabinet.

2. The integral type air conditioner according to claim 1, further comprising a filter grill covering the air discharge part of the cabinet for guiding a discharge of air that has passed through the high performance filter.

3. The integral type air conditioner according to claim 1, further comprising a filter grill detachably provided at a discharge side of the high performance filter.

4. The integral type air conditioner according to claim 1, further comprising a filter grill provided at the discharge part of the cabinet.

5. The integral type air conditioner according to claim 1, further comprising a filter mounting part protruding on the upper air guide and on which the high performance filter is mounted.

6. The integral type air conditioner according to claim 1, wherein the passage guide assembly is tilted with respect to performance of an air cleaning function such that one of the air discharge part of the front panel and the air discharge part of the cabinet is closed.

7. The integral type air conditioner according to claim 1, wherein the passage guide assembly comprises a passage guide plate and driven by an external force in the upper air guide.

8. The integral type air conditioner according to claim 1, wherein the plurality of passages comprises an upper passage formed on an upper surface of the upper air guide and a front passage formed on a front surface of the upper air guide, and wherein the passage guide assembly is formed between the upper passage and the front passage.

9. The integral type air conditioner according to claim 1, wherein the heat-exchanged indoor air is selectively discharged through a front surface and an upper surface of the upper air guide.

10. The integral type air conditioner according to claim 1, wherein the filter grill is attachable or detachable from the cabinet.

11. The integral type air conditioner according to claim 1, wherein the filter grill aligns with the high performance filter.

12. The integral type air conditioner according to claim 1, further comprising a grill mounting part where the grill mounting part protrudes from the cabinet.

13. An integral type air conditioner comprising:
a base panel disposed at a lower surface of the air conditioner;

an air guide mounted on the base panel, for partitioning the air conditioner into an indoor unit part formed at an approximate front portion of the base panel and an outdoor unit part formed at a rear portion of the base panel;

an inflow guide formed at a front portion of the air guide, for guiding air introduced from an indoor space;

heat exchangers formed respectively at the indoor unit part and the outdoor unit part;

two indoor fans and two outdoor fans for blowing air onto an entire surface of the heat exchangers;

a compressor mounted at a center portion of the outdoor fan on the base panel;

a high performance filter formed at an upper portion of the air guide, for filtering indoor air discharged toward an upward direction of the air conditioner;

a passage guide assembly for allowing heat exchanged indoor air to be selectively introduced into the high performance filter; and a cabinet forming an appearance of the air conditioner and having a filter grill formed at a portion where air filtered by the high performance filter is discharged.

14. The integral type air conditioner according to claim 13, wherein the air guide comprises:
a lower air guide vertically installed on the base; and an upper air guide in which the passage guide assembly is installed, the upper air guide being mounted on an upper position of the lower air guide, wherein the lower air guide is provided with a barrier formed at a frontal center portion to partition the front space of the lower air guide into a left space and a right space, and the two indoor fans are respectively installed at the left space and the right space.

* * * * *